(12) United States Patent
Ura et al.

(10) Patent No.: US 6,708,200 B1
(45) Date of Patent: Mar. 16, 2004

(54) COMMUNICATION SYSTEM AND COMMUNICATION METHOD

(75) Inventors: Seiji Ura, Osaka (JP); Yoshifumi Yonemoto, Kanagawa (JP); Hiromi Wada, Osaka (JP); Junji Ishigaki, Tokyo (JP); Masaharu Nakatsuchi, Kanagawa (JP); Keizaburo Sasaki, Kanagawa (JP)

(73) Assignees: Matsushita Electric Industrial Co., Ltd., Osaka (JP); Matsushita Communication Industrial Co., Ltd., Kanagawa (JP); NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/622,726

(22) PCT Filed: Dec. 21, 1999

(86) PCT No.: PCT/JP99/07172

§ 371 (c)(1),
(2), (4) Date: Sep. 25, 2000

(87) PCT Pub. No.: WO00/38382

PCT Pub. Date: Jun. 29, 2000

(51) Int. Cl.⁷ .............................................. G06F 13/00
(52) U.S. Cl. ....................................................... 709/203
(58) Field of Search ................................ 713/187, 200, 713/201, 188, 189, 190, 191, 192, 193, 194, 116; 709/200, 203

(56) References Cited

U.S. PATENT DOCUMENTS 5,369,702 A * 11/1994 Shanton ...................... 713/116
6,298,446 B1 * 10/2001 Schreiber et al. ........... 713/201

FOREIGN PATENT DOCUMENTS

| JP | 9-191318 | 7/1997 |
| JP | 10-135942 | 5/1998 |
| JP | 10-327193 | 12/1998 |
| JP | 11-249559 | 9/1999 |

\* cited by examiner

Primary Examiner—Robert B. Harrell
(74) Attorney, Agent, or Firm—Pearne & Gordon LLP

(57) ABSTRACT

There is provided a communication system capable of reducing the burden of the terminal that is connected to the Internet via the communication network such as the mobile telephone network, whose security is ensured, and is used to carry out the electronic commerce and the banking service. An encryption communication request generating portion (101) of a client system (100) sends out a security request of a communication route to a gateway server unit (200), an encryption communication controlling portion (203) of the gateway server unit sets up encryption communication between a content server unit (300) and the gateway server unit in response to this, the content server unit encrypts data to be transmitted to the client system and then transmits it to the gateway server unit, and an encryption communication controlling portion of the gateway server unit decrypts this data and transmits it to the client system. Encryption/decryption processing systems are not needed in the client system and thus the burden can be reduced.

5 Claims, 4 Drawing Sheets

FIG. 7

```
HTTP/1.0 200 OK

Date: Mon, 14 Dec 1998 13:00:00 GMT

Content-Length: 129

Content-Type: text/html

<HTML>

<BODY>

<CENTER>

<H1> BALANCE INQUIRY </H1>

14 Dec 13:00 PRESENT DEPOSIT BALANCE AMOUNT IS

<BR>

¥128,000

</CENTER>

</BODY>

</HTML>
```

COMMUNICATION SYSTEM AND COMMUNICATION METHOD

TECHNICAL FIELD

The present invention relates to a communication system and a communication method in which a client and a server belong to different communication networks and communicate via gateway servers that relay the different communication networks and, more particularly, intends to reduce the burden of a client system in encryption communication.

BACKGROUND ART

In recent years, because of the advent of World Wide Web (referred to as "Web" hereinafter), various services can be offered on the Internet. Especially, it is expected that the electronic commerce and the Internet banking service are spread much more in the future.

In these services, insurance of the security is the absolute condition. However, furtive glance of the data can be relatively easily carried out in the present Internet. In particular, since normally the data are transmitted/received as the text without encryption in the Web, it is impossible to say that the security can be sufficiently ensured.

Currently, the security is ensured on the Internet by using various public keys and the common keys, and digest of the data based on the Hash function. Especially, as the protocol for enabling the secure communication between the client and the server on the Web, SSL (Secure Sockets Layer) is widely employed.

For example, in "Communication System, Message Processing Method, and Computer System" set forth in Patent Application Publication (KOKAI) Hei 10-135942, an example of the message process communication system using the public key cipher is disclosed.

Meanwhile, in the prior art, the Internet is used on the personal computer (abbreviated as "PC" hereinafter) or the workstation (abbreviated as "WS" hereinafter). However, in recent years, the use on various equipments other than PC begins. For example, the mobile information terminal and the mobile telephone that can utilize the Web appear.

These devices are small and portable. If these devices are connected to the Internet via the radio network such as the mobile telephone network, the electronic commerce and the banking service using the Internet are available at any time in any place.

However, normally these devices have a processing speed slower than the PC and small memory capacity, and thus restrictions on the installed softwares are great.

The encryption/decryption softwares and the SSL protocol necessary for the electronic commerce and the banking service using the Internet to ensure the security need complicated computation. Thus, the load is heavy to perform the processes by the mobile information terminal whose processing ability is limited rather than the PC. There is such a possibility that the service cannot be offered smoothly.

By the way, normally the data flowing through the mobile telephone network are encrypted. The encrypting and decrypting functions of the data are provided originally to the terminal of the mobile telephone.

In other words, unlike the Internet, the security is established as the communication network in the mobile telephone network.

Therefore, for the terminal employed on the communication network in which the security is ensured, it may be considered as the extra process to execute the encryption and decryption processes necessary for transmission/reception of the data on the Internet in addition to the security offered by the communication network.

The present invention has been made in light of such problems, and it is an object of the present invention to provide a communication method capable of reducing the burden of the terminal device, that is connected to the Internet via the communication network such as the mobile telephone network, whose security is ensured, and used to carry out the electronic commerce and the banking service, and a communication system for embodying the communication method.

DISCLOSURE OF THE INVENTION

In a communication method of the present invention, in a communication that is carried out between a content server unit for managing content data and a client system located on a different communication network from the content server unit via a gateway server unit for relaying different communication networks, if security of communication between the client system and the gateway server unit is ensured, encryption of data is not performed in communication networks between the client system and the gateway server unit and the encryption of data is performed only by the communication by the communication networks between the gateway server unit and the content server unit, whose security is not ensured.

Also, in a communication system for embodying this communication method, a data communicating means for transmitting/receiving data to/from the gateway server unit, and an encryption communication requesting means for sending out a security request of communication between the client system and the content server unit via the data communicating means are provided to a client system, and also a client data communicating means for transmitting/receiving the data to/from the client system, a server data communicating means for transmitting/receiving the data to/from the content server unit, and an encryption communication controlling means for performing setting process of encryption communication between the gateway server unit and the content server unit in response to the security request from the client system via the server data communicating means and performing decryption of encrypted data received from the server data communicating means and encryption of the data to be output to the server data communicating means are provided to a gateway server unit.

Therefore, installing of the encryption/decryption processing systems into the client system can be omitted while ensuring the security in all communication routes between the client system and the content server unit, and thus the burden of the client system can be reduced.

According to a first aspect of the present invention, in a communication method which is carried out between a content server unit for managing content data and a client system located on a different communication network from the content server unit via a gateway server unit for relaying different communication networks, if security of communication between the client system and the gateway server unit is ensured, encryption of data is not performed in communication networks between the client system and the gateway server unit and the encryption of data is performed only by the communication by the communication networks between the gateway server unit and the content server unit, whose security is not ensured. Therefore, there is no necessity to set the encryption communication and install the processing system for decrypting the encrypted data into the client system, and thus the burden of the client system can be reduced.

According to a second aspect of the present invention, the client system sends out a security request of a communication route to the gateway server unit, the gateway server unit sets up encryption communication between the content server unit and the gateway server unit in response to this, the content server unit encrypts data to be transmitted to the client system and then transmits it to the gateway server unit, and the gateway server unit decrypts the data and transmits it to the client system. Therefore, the data transmitted from the content server unit is encrypted and then transmitted securely.

According to a third aspect of the present invention, the client system sends out a security request of a communication route together with data transmission to the gateway server unit, the gateway server unit sets up encryption communication between the content server unit and the gateway server unit in response to this, then encrypts the data, and then transmits it to the content server unit. Therefore, the data transmitted from the gateway server unit to the content server unit is encrypted and then transmitted securely.

According to a fourth aspect of the present invention, in a communication system in which communication is carried out between a content server unit for managing content data and a client system located on a different communication network from the content server unit via a gateway server unit for relaying different communication networks, the client system and the gateway server unit are connected via a communication network whose security is ensured, a data communicating means for transmitting/receiving data to/from the gateway server unit, and an encryption communication requesting means for sending out a security request of communication between the client system and the content server unit via the data communicating means are provided to the client system, and also a client data communicating means for transmitting/receiving the data to/from the client system, a server data communicating means for transmitting/receiving the data to/from the content server unit, and an encryption communication controlling means for performing setting process of encryption communication between the gateway server unit and the content server unit in response to the security request from the client system via the server data communicating means and performing decryption of encrypted data received from the server data communicating means and encryption of the data to be output to the server data communicating means are provided to the gateway server unit. Therefore, there is no necessity to set the encryption communication and install the processing system for decrypting the encrypted data into the client system, and thus the burden of the client system can be reduced.

According to a fifth aspect of the present invention, a web protocol processing means for transmitting/receiving the data of World Wide Web to/from the gateway server unit via the data communicating means is provided to the client system, and also a web protocol processing means for transmitting/receiving the data of World Wide Web via the client data communicating means and the server data communicating means is provided to the gateway server unit. Therefore, while ensuring the security of data transmission that uses the Web Protocol such as HTTP, the burden of the client system can be reduced.

BRIEF DESCRIPTION OF THE DRAWINGS

FIG. 7 is an example of a web response that the gateway server unit receives from the content server unit.

BEST MODE FOR CARRYING OUT THE INVENTION

An embodiment of the present invention will be explained with reference to the drawings hereinafter.

Figure 1:
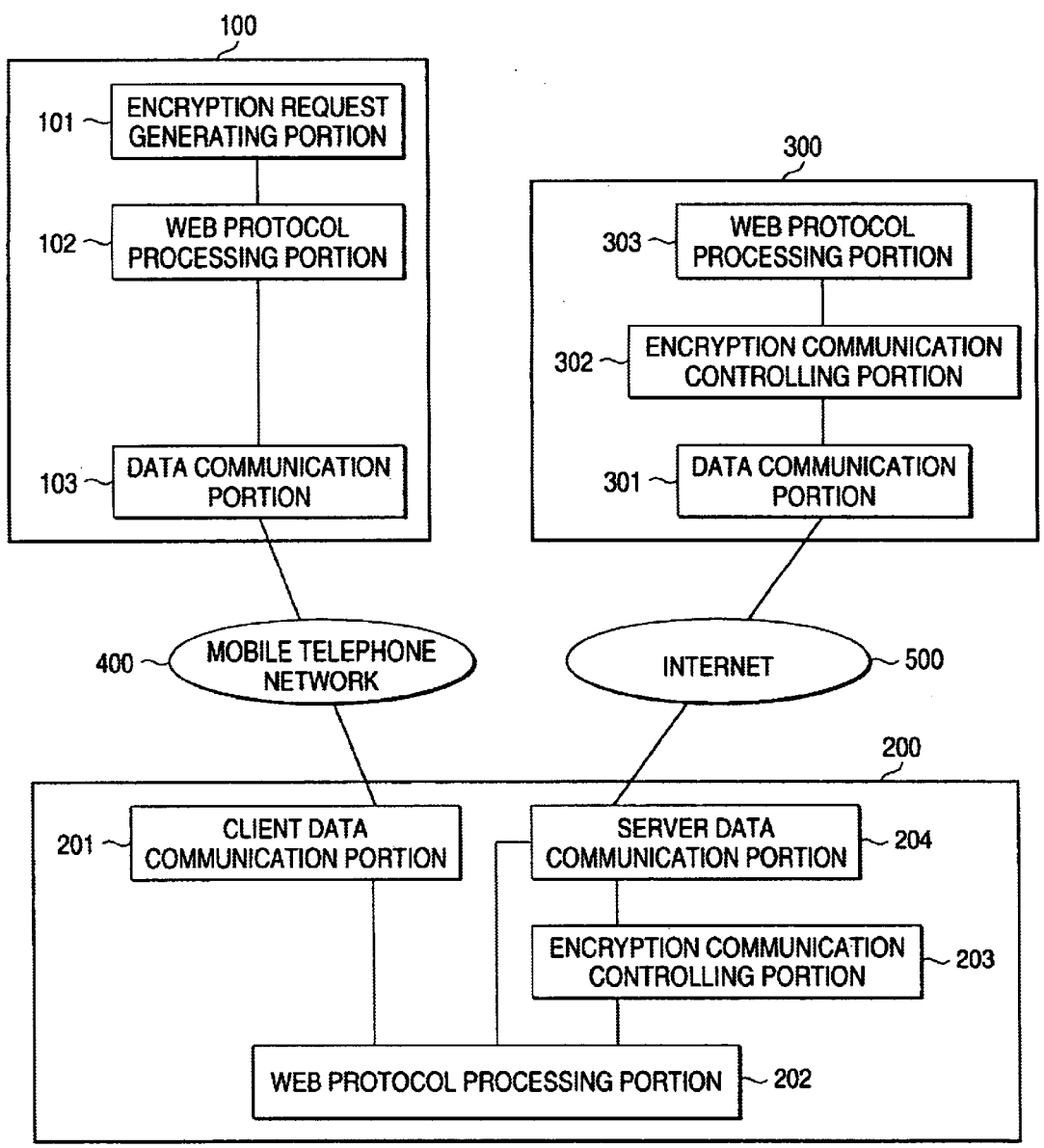
FIG. 1 is a view showing a configuration of a communication system according to an embodiment of the present invention.

As shown in FIG. 1, this communication system comprises a client system 100 for executing the communication via the mobile telephone network 400, a gateway server unit 200 for relaying the mobile telephone network 400 as a different communication network and the Internet 500, and a content server unit 300 connected to the gateway server unit 200 via the Internet 500.

The client system 100 comprises an encryption communication request generating portion 101 for generating the request that requests to transmit/receive the data securely between the client system 100 and the content server unit 300, a web protocol processing portion 102 for processing the Web transfer protocol HTTP (Hyper Text Transfer Protocol) employed commonly among the client system 100, the gateway server unit 200 and the content server unit 300, a data communication portion 103 for transmitting/receiving the data to/from the mobile telephone network 400.

Also, the gateway server unit 200 comprises a client data communication portion 201 for transmitting/receiving the data to/from the mobile telephone network 400, a web protocol processing portion 202 for processing the Web transfer protocol HTTP employed commonly among the client system 100, the gateway server unit 200 and the content server unit 300, an encryption communication controlling portion 203 for establishing the encrypted secure communication between the gateway server unit 200 and the content server unit 300 in response to the request issued from the client system 100 to execute the encryption and the decryption of the data, and a server data communication portion 204 for transmitting/receiving the data to/from the Internet 500.

Also, the content server unit 300 comprises a data communication portion 301 for transmitting/receiving the data to/from the Internet 500, an encryption communication controlling portion 302 for establishing the encrypted secure communication between the gateway server unit 200 and the content server unit 300 in response to the request issued from the gateway server unit 200 to execute the encryption and the decryption of the data, and a web protocol processing portion 303 for processing the Web transfer protocol HTTP employed commonly among the client system 100, the gateway server unit 200 and the content server unit 300.

If the client system 100 of the communication system wishes the secure communication with the content server unit 300, it requests the encryption communication between the gateway server unit 200 and the content server unit 300 of the gateway server unit 200 together with the output of the transmitted data.

In response to this, the gateway server unit 200 establishes the encryption communication between the gateway server unit 200 and the content server unit 300, then encrypts the transmitted data, and then transmits the encrypted data to the content server unit 300. Also, the content server unit 300 encrypts the data to be transmitted to the client system 100, and then transmits the encrypted data to the gateway server unit 200. Then, gateway server unit 200 decrypts the encrypted data and then transmits the data to the client system 100.

Figure 2:
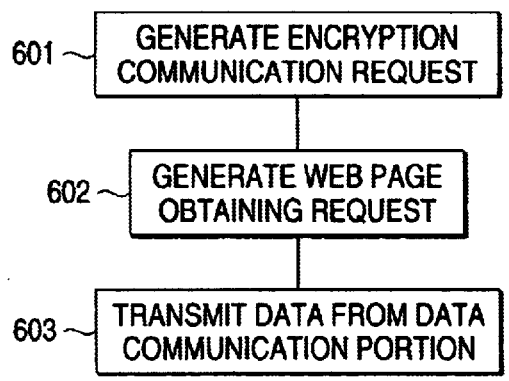
FIG. 2 is a flowchart showing an operation of a client system in the embodiment of the present invention.

FIG. 2 shows flow of processes when the client system 100 of the communication system issues the request for establishment of the encryption communication.

Step 601: The encryption communication request generating portion 101 generates the encryption communication request.

Step 602: The web protocol processing portion 102 generates the web page obtaining request in the web protocol based on the encryption communication request generated by the encryption communication request generating portion 101.

Step 603: The data communication portion 103 transmits the web page obtaining request generated by the web protocol processing portion 102 to the gateway server unit 200 via the mobile telephone network 400.

Figure 3:
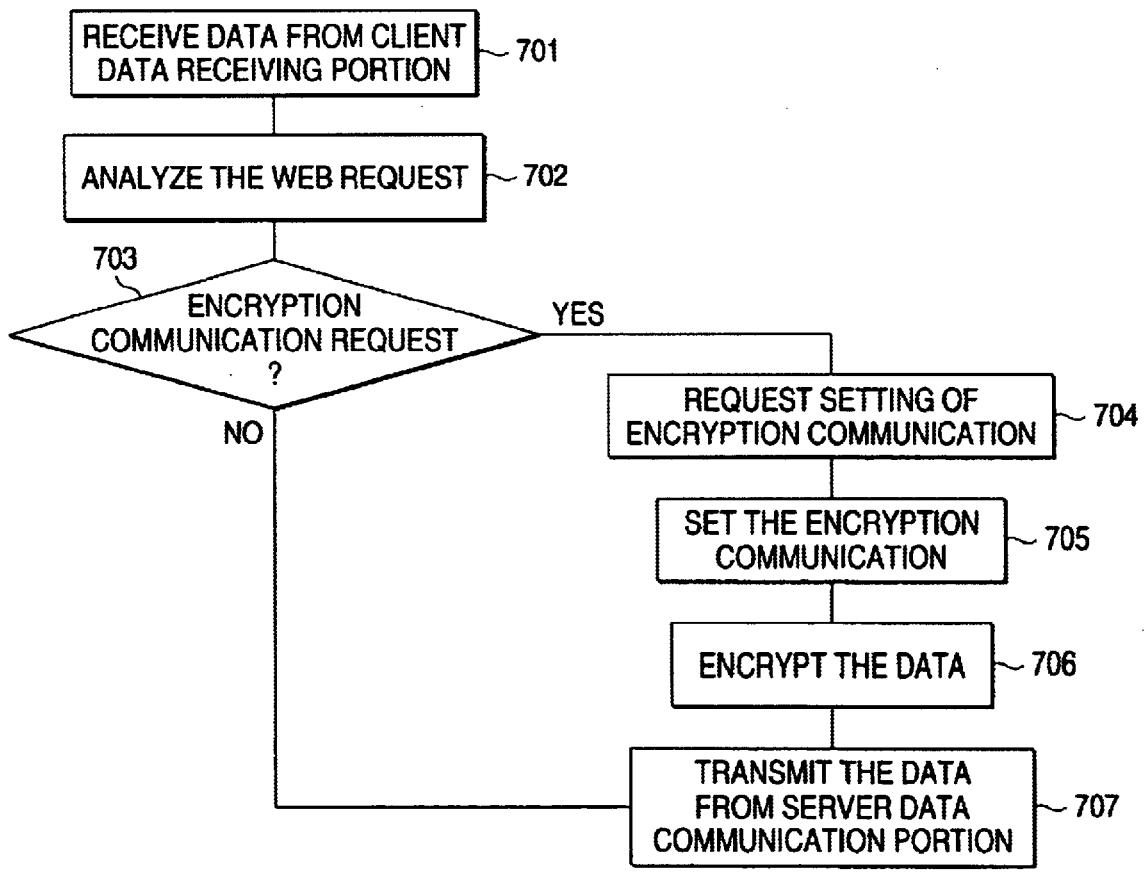
FIG. 3 is a flowchart showing an operation of a gateway server unit when it receives data from the client system in the embodiment of the present invention.

FIG. 3 shows flow of processes after the gateway server unit 200 of this communication system receives the data transmitted from the client system 100.

Step 701: When the client data communication portion 201 receive the data transmitted from the client system 100, it transmits the data to the web protocol processing portion 202.

Step 702: The web protocol processing portion 202 analyzes the data received by the client data communication portion 201.

Step 703: The web protocol processing portion 202 decides whether or not this data is the web request containing the request for establishing the encryption communication from the client system 100. If the data is the web request containing the request for establishing the encryption communication, the portion 202 starts the encryption communication controlling portion 203.

Step 704: The started encryption communication controlling portion 203 transmits the request for setting the encryption communication to the content server unit 300 via the server data communication portion 204.

Step 705: The gateway server unit 200 executes the process for setting the encryption communication with the content server unit 300.

Step 706: The encryption communication controlling portion 203 then encrypts the web page obtaining request being analyzed by the web protocol processing portion 202 in compliance with this setting, and then transmits the encrypted data to the server data communication portion 204.

Step 707: The server data communication portion 204 transmits the data, which is requested to transmit, to the content server unit 300 via the Internet 500.

Also, in step 703, if the analyzed data is the normal web request not containing the request for establishing the encryption communication, the process goes to step 707.

The web protocol processing portion 202 transmits the web request to the server data communication portion 204 as it is.

In the content server unit 300, the data communication portion 301 receives the data transmitted from the Internet 500. If the data is encrypted, the encryption communication controlling portion 302 decrypts the data and then the web protocol processing portion 303 executes the web transfer process.

Also, in the case that the content server unit 300 transmits the data requested by the client system 100, when the process for establishing the encryption communication between the gateway server unit 200 and the content server unit 300 is carried out, the encryption communication controlling portion 302 encrypts the data and then the data communication portion 301 sends out the encrypted data to the Internet 500.

Figures 4, 5, 6:
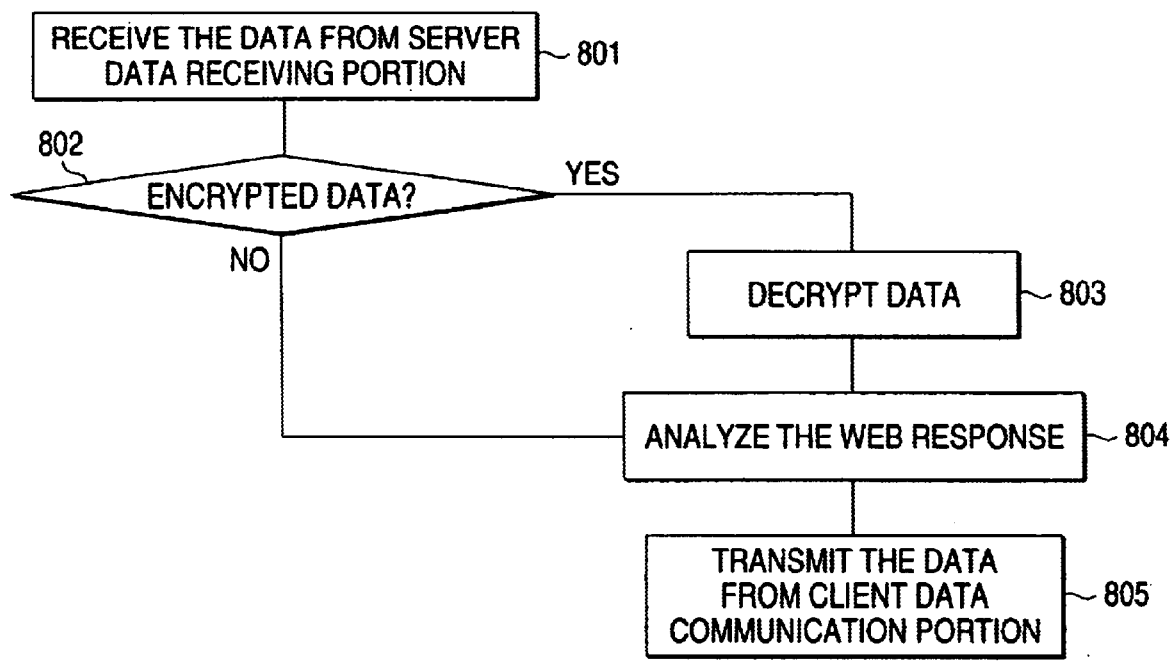
FIG. 4 is a flowchart showing an operation of the gateway server unit when it receives data from a content server unit in the embodiment of the present invention.
FIG. 5 is an example of an encryption communication request generated by an encryption communication request generating portion of the client system.
FIG. 6 is an example of a web page obtaining request generated by a web protocol processing portion of the client system.

FIG. 4 shows flow of succeeding processes when the gateway server unit 200 of this communication system receives the data transmitted from the content server unit 300.

Step 801: The server data communication portion 204 receives the data from the content server unit 300.

Step 802: The server data communication portion 204 decides whether or not the data received from the content server unit 300 is the encrypted data. If the data is the encrypted data, the server data communication portion 204 starts the encryption communication controlling portion 203.

Step 803: The encryption communication controlling portion 203 decrypts the encrypted data received by the server data communication portion 204, and then transmits the received data to the web protocol processing portion 202.

Step 804: The web protocol processing portion 202 analyzes the received web response, and then transmits the analyzed web response to the client data communication portion 201.

Step 805: The client data communication portion 201 transmits the received web response to the client system 100 via the mobile telephone network 400.

Also, in step 802, if the data received from the content server unit 300 is not the encrypted data, the server data communication portion 204 transmits the received data to the web protocol processing portion 202, and then the processes in step 804 and step 805 are carried out.

FIG. 5 is an example of the encryption communication request generated by the encryption communication request generating portion 101 of the client system 100. The client system 100 requests the establishment of the encryption communication by using a key word "https" in FIG. 5.

FIG. 6 is an example of the web page obtaining request generated by the web protocol processing portion 102 of the client system 100 based on the encryption communication request in FIG. 5. The web page obtaining request in FIG. 6 is constructed by attaching several information required for the web protocol as headers to the encryption communication request as a head portion.

In this case, the key word for establishing the encryption communication is not limited to the example "https" in FIG. 5. Any key word arranged among the web protocols used in the client system 100, the gateway server unit 200, and the content server unit 300 may be employed.

In addition, the keyword for establishing the encryption communication is not always positioned at the head line of the web page obtaining request, as shown in the example in FIG. 6. For example, various parameters necessary for the establishment of the encryption communication may be set forth as the header other than the head of the request.

FIG. 7 is an example of the web response obtained by decrypting the encrypted data being transmitted from the content server unit 300 to the gateway server unit 200 when the gateway server unit 200 transmits the web page obtaining request in FIG. 6 to the content server unit 300.

In this case, in the embodiment of the present invention, the mobile telephone network is used as the communication network in which the security between the client system 100 and the gateway server unit 200 is ensured. However, other communication networks may be used if they are the communication network in which the security is ensured. The application of the present invention is not limited to the mobile telephone network.

Furthermore, in the embodiment of the present invention, the client system 100, the gateway server unit 200, and the content server unit 300 communicate with each other by using the web protocol (HTTP). However, the application of the present invention is not limited to the HTTP.

INDUSTRIAL APPLICABILITY

As apparent from the above explanation, in the communication method and the communication system of the present invention, the client system on the communication network in which the security is ensured can receive securely the data transmitted from the content server unit by merely transmitting the encryption communication request to the gateway server. Therefore, there is no necessity to install the process systems for setting the encryption communication and decrypting the encrypted data onto the client system. Thus, devices having the small memory capacity other than the PC can be employed as the client system.

Also, not only the data received from the content server but also the data transmitted from the client system can be transmitted securely by using the encryption.

In addition, in case the web protocol such as HTTP is employed, the client system on the communication network in which the security is ensured can transmit/receive the data securely between the content server unit and the client system unless the process systems for setting the encryption communication and decrypting the encrypted web data are installed.

We claim:

1. A communication method which is carried out between a content server unit for managing content data and a client system located on a different communication network from the content server unit via a gateway server unit for relaying different communication networks, characterized in that, if security of communication between the client system and the gateway server unit is ensured, encryption of data is not performed in communication networks between the client system and the gateway server unit and the encryption of data is performed only by the communication by the communication networks between the gateway server unit and the content server unit, whose security is not ensured.

2. A communication method according to claim 1, wherein he client system sends out a security request of a communication route to the gateway server unit, the gateway server unit sets up encryption communication between the content server unit and the gateway server unit in response to this, the content server unit encrypts data to be transmitted to the client system and then transmits it to the gateway server unit, and the gateway server unit decrypts the data and transmits it to the client system.

3. A communication method according to claim 1, wherein the client system sends out a security request of a communication route together with data transmission to the gateway server unit, the gateway server unit sets up encryption communication between the content server unit and the gateway server unit in response to this, then encrypts the data, and then transmits it to the content server unit.

4. A communication system in which communication is carried out between a content server unit for managing content data and a client system located on a different communication network from the content server unit via a gateway server unit for relaying different communication networks, characterized in that the client system and the gateway server unit are connected via a communication network whose security is ensured, the client system includes a data communicating means for transmitting/receiving data to/from the gateway server unit, and an encryption communication requesting means for sending out a security request of communication between the client system and the content server unit via the data communicating means, and the gateway server unit includes a client data communicating means for transmitting/receiving the data to/from the client system, a server data communicating means for transmitting/receiving the data to/from the content server unit, and an encryption communication controlling means for performing setting process of encryption communication between the gateway server unit and the content server unit in response to the security request from the client system via the server data communicating means and performing decryption of encrypted data received from the server data communicating means and encryption of the data to be output to the server data communicating means.

5. A communication system according to claim 4, wherein the client system includes a web protocol processing means for transmitting/receiving the data of World Wide Web to/from the gateway server unit via the data communicating means, and the gateway server unit includes a web protocol processing means for transmitting/receiving the data of World Wide Web via the client data communicating means and the server data communicating means.

* * * * *

UNITED STATES PATENT AND TRADEMARK OFFICE
CERTIFICATE OF CORRECTION

PATENT NO. : 6,708,200 B1
DATED : March 16, 2004
INVENTOR(S) : Seiji Ura et al.

It is certified that error appears in the above-identified patent and that said Letters Patent is hereby corrected as shown below:

Title page,
Item [30], Foreign Application Priority Data, please insert the following:
-- [30] Foreign Application Priority Data
    Dec. 21, 1998(JP).........................10-362917 --
Item [56], References Cited, U.S. PATENT DOCUMENTS, please insert the following referrence:
-- 5,600,722            2/1997 Yamaguchi et al.        380/21 --.
FOREIGN PATENT DOCUMENTS, please insert the following references:
-- WO          96/13113       5/1996
   JP          10-327193      12/1998 --
OTHER PUBLICATIONS, please insert the following references:
-- M.S. Iqbal, PhD, F.S.F. Poon, PhD, "Packel Level Access Control Scheme for Internet Security", IEE Proceedings-I, April 1992, pages 165-175.
Christer Erlandson and Per Ocklind, "WAP-The Wirless Application Protocol", 1998, pages 150-153. --

Column 8,
Line 4, please delete "wherein he client system", and insert therefor -- wherein the client system --.

Signed and Sealed this

Fourth Day of January, 2005

JON W. DUDAS
*Director of the United States Patent and Trademark Office*